United States Patent
Hansen

[15] 3,707,132
[45] Dec. 26, 1972

[54] SOD KNIFE FOR ANHYDROUS AMMONIA

[72] Inventor: Clarence M. Hansen, East Lansing, Mich.

[73] Assignee: Board of Trustees of Michigan State University, East Lansing, Mich.

[22] Filed: July 1, 1970

[21] Appl. No.: 51,644

[52] U.S. Cl.................................111/7, 172/678
[51] Int. Cl..........................................A01c 23/02
[58] Field of Search........................111/6–7, 85; 172/239, 261.4, 678, 705, 764

[56] References Cited

UNITED STATES PATENTS

| | | | |
|---|---|---|---|
| 2,842,077 | 7/1958 | Morrison | 111/7 |
| 3,296,985 | 1/1967 | Shelton | 111/7 |
| 2,849,969 | 9/1958 | Taylor | 111/7 |
| 2,439,743 | 4/1948 | McEwen | 111/7 |
| 2,724,318 | 11/1955 | Erickson et al. | 172/678 |
| 2,874,656 | 2/1959 | Bennett | 111/7 |
| 2,988,026 | 6/1961 | Heckathorn | 111/7 |

Primary Examiner—Robert E. Bagwill
Attorney—Miller, Morriss, Pappas & McLeod

[57] ABSTRACT

A constant attitude sod knife for injection of anhydrous ammonia to the soil which includes a ground opening blade structure, a gas injection tube disposed at the heel or trailing of the blade and covered by a diffusion director vane or wing and subsequently by a tamping or compaction vane or wing which serves to restrict emission of gaseous materials to the atmosphere and a spring biased carriage facilitating a constant running attitude whereby the blade may change elevation without changing attitude, and an impact disengaging connection and depth control wheel for the carriage.

4 Claims, 6 Drawing Figures

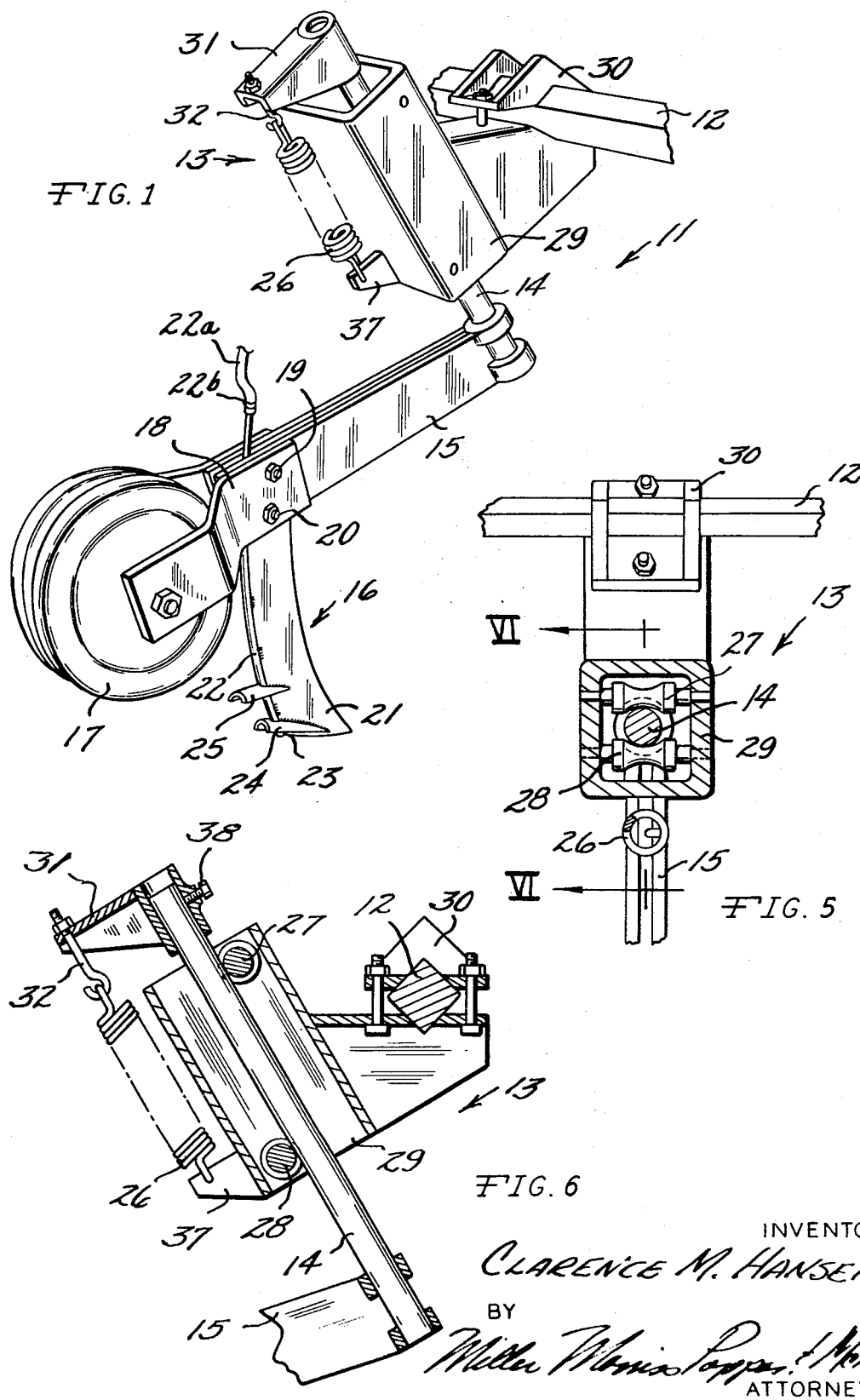

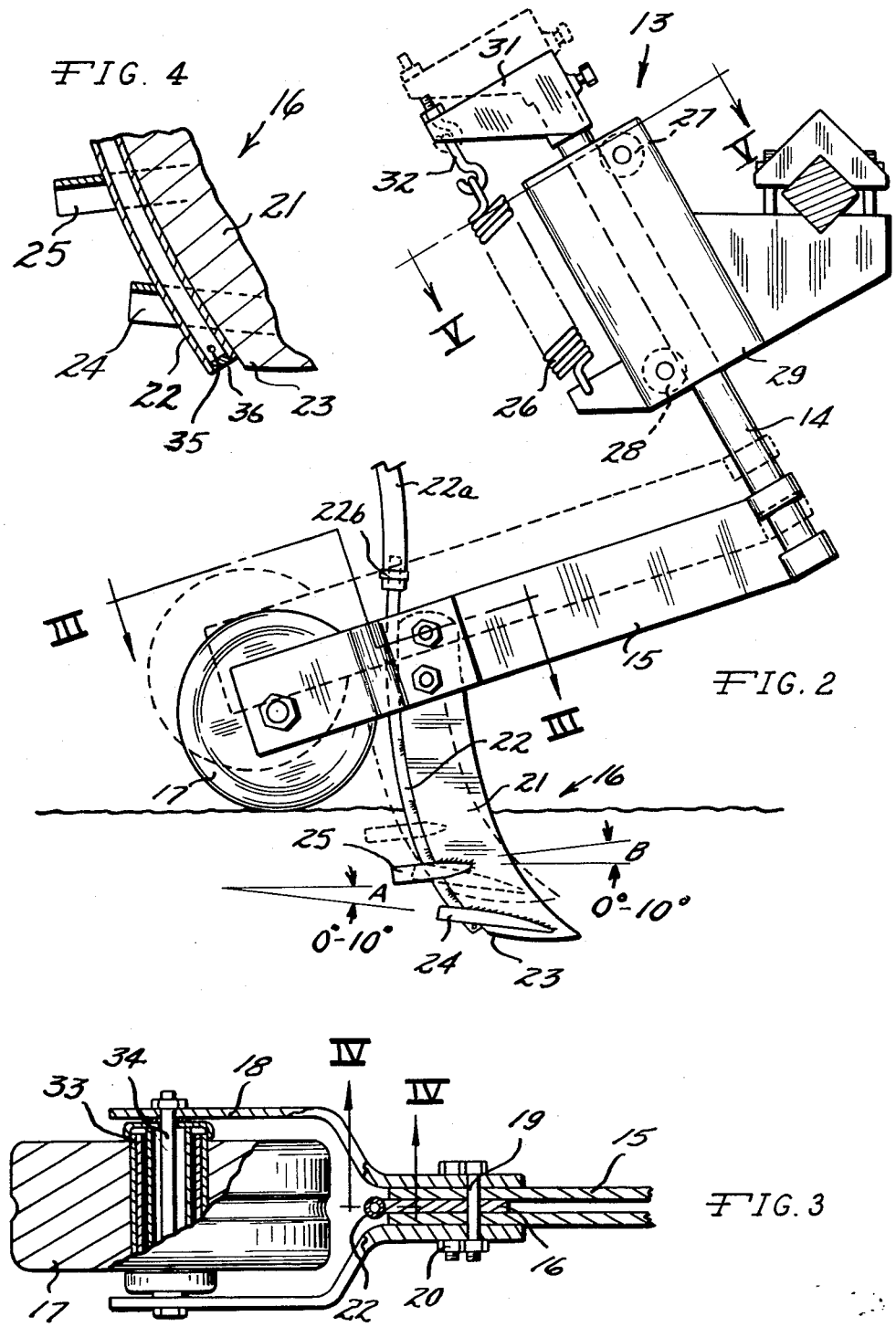

SOD KNIFE FOR ANHYDROUS AMMONIA

The present invention relates to an improved sod knife or a ground opening device by which means a gaseous or liquid material such as fertilizer, fumigant or conditioner, for example, anhydrous ammonia, is injected into the opened soil, is urged in place to selectively propogate or diffuse, and is then substantially tamped by sub-surface tamping to allow slow dispersion outwardly from the situs of entry. The present invention proposes to nest the delivery tube along the trailing edge of the vertical sod knife or blade to a point adjacent the heel of the blade or at the trailing edge at the point of furrow closure behind the blade opening. A diffusion deflector vane or wing is provided above the emission point to laterally diffuse the liquid or gaseous material into the earth flanking the blade made furrow or opening and to restrict vertical emission along the trailing edge of the blade above the tube portals. Then a tamping deflector or plate is provided above and trailing the diffusion deflector which tends to close and tamp the furrow or opening behind the blade movement at a sub-surface level. To accomplish this the blade structure of the applicator required change from prior art approaches and the carriage mechanism required adapting so that the running attitude of the blade remains reasonably constant despite local changes in depth. The running depth is generally controlled by a ground engaging gauge wheel. The gauge wheel is preferably trailing the blade to accomplish a surface tamp of the furrow. The device is protected by a suitable impact disconnect means such as a shear bolt or shear pin which prevents serious damage as could result from the blade encountering a boulder, rock, or overly hard ground. In exceptionally hard ground the knife performs best when lead by a ground opening coulter wheel.

The prior art is fairly well represented by the devices seen in the U.S. Pat. Nos. to: Taylor 2,849,969, Johnson 3,038,424, Johnston 3,188,989, Heckathorn 2,988,026, and Shelton 3,296,985.

The use of anhydrous ammonia and liquid or gaseous fertilizers or fumigants requires the injection of material into the earth and their disposition requires control against loss to the atmosphere. Accordingly, many expedients have been used to accomplish injection into the earth without loss. Every device tested to date has had serious drawbacks related to the fact that terrain differences or conditions result in a changing blade attitude and where this has been possible to control, the escape of gaseous or liquid fertilizer has been upward along the trailing edge of the blade and before the furrow can be closed. The present device accordingly provides a running fixed attitude construction allowing the use of two separate fixed angle plate-like elements. The lower one is a deflector wing element for lateral diffusion and for interrupting the upward travel of the gas or liquid and the other plate-like element overlaps the lower deflector in a trailing sequence sense to provide a gentle but firm running tamping closure of the furrow below the surface of the earth but above the diffusion point at the heel of the blade.

Accordingly, the principal object of the present invention is to provide a soil knife which presents a constant running attitude while varying as to depth position. A collateral object is the provision of a soil knife for liquid and gaseous fertilizers and soil conditioners in which a pair of plate elements (deflector and tamper) overhang the emission point each at different fixed attitudes. Another object is to provide a shear pin protected blade and carriage so that disabling obstacles will not seriously impair the carriage performance and construction.

In the drawings:

FIG. 1 is a perspective view of the sod knife of the present invention and indicating the attachment of the knife to a gang draw bar and indicating the tubular feed connection for liquid or gaseous fertilizer, soil fumigant, or soil conditioner.

FIG. 2 is a side elevation view of the sod knife seen in FIG. 1 and indicating the insertion of the blade into the ground and indicating the fixed attitude of the blade while the carriage position is variable.

FIG. 3 is a partial cross section elevation view taken on the line III—III of FIG. 2 and indicating the shear pin construction and orienting the blade in relation to the feed tube.

FIG. 4 is a partial enlarged cross section elevation view taken on the line IV—IV of FIG. 3 and indicating the relative positions of tube, diffuser or deflector and tamper.

FIG. 5 is a cross section elevation view taken on the line V—V of FIG. 2 and indicating the carriage construction and indicating the roller buttressing of the mounting shaft.

FIG. 6 is a full section elevation view of the carriage taken on the line VI—VI of FIG. 5 and best indicates the spring bias application of force urging the mounting shaft toward the earth while allowing the shaft to swivel and move against the spring bias and against the buttress of the rollers.

GENERAL DESCRIPTION

The sod knife of the present invention is an earth opening blade which is provided with a feed tube which parallels the back or trailing edge of the blade and is secured thereto. A lower diffusion plate is provided in a diving attitude over the emission point of the tube adjacent the heel of the blade, and a tamping plate is positioned above and rearwardly of the emission point and above the diffusion plate and at a climbing angle or attitude to accomplish subsurface tamping of the furrow.

A carriage assembly is provided which is rigidly attachable to a draw bar element pulled by a prime mover or tractor. The carriage assembly projects from the bar at a selected fixed angle and includes journal means which support a blade mounting shaft for rotation on the shaft axis and for axial linear movement. The carriage also includes a spring which applies a force directing the shaft downwardly toward engagement with the earth. A knife supporting arm projects radially from the end of the mounting shaft. The arm is bifurcated to receive therebetween the knife or blade. Over the end of the arm the gauge wheel clevis assembly extends and a pair of bolts in spaced relation through clevis assembly, arm and blade supports the gauge wheel and blade in fixed relation to the arm. One of the bolts is a shear pin calculated to shear if the blade strikes an object such as a boulder and without riding over the obstacle. Other means of stress relieving may be used to prevent impact injury and where exceptionally heavy ground is encountered a coulter wheel may be used to lead the blade to pre-open the ground. The gauge wheel pilots the blade in a relationship to the earth to provide a reasonably constant blade elevation and as will be seen to provide a following surface tamp. The wheel and blade on shearing of the shear pin bolt are pivotal on the remaining bolt, thus freeing themselves of being a rigid extension of the arm, and damage is thereby avoided. This provides an overload disconnect against impact loading or the like. Where the wheel engages irregularities in the earth it may rise and when it does so the arm arises with the wheel and the shaft moves linearly in its journal against the spring bias so that the blade attitude in the earth remains fixed, although the depth of the blade may vary somewhat with terrain irregularities. The spring bias urges full depression in the earth. A tube welded, brazed or otherwise affixed to the backside or heel of the knife blade and terminates at the lower end adjacent the bottom of the blade and at the upper end extends above the blade to provide a nipple for attachment of a feed hose. Two plate-like elements extend laterally from the blade, the lower or deflector plate being the larger of the two plates and at its leading edge being disposed downwardly from horizontal thereby guiding the blade tip downwardly in a diving attitude. The deflector plate extends rearwardly beyond the tube. The upper or tamping plate is oriented upwardly at a slight angle in a climbing attitude partially counteracting the tendency of the lower plate to plunge the blade downwardly. This upper plate, having a lower trailing edge which lags behind the lower plate, accomplishes a sub-surface tamping and forcefully tamps the earth into the earth fissure formed by the action of the blade and further tamping is accomplished at the surface by the gauge wheel. Thus the entire structure provides a fixed attitude for the deflector and tamper plates on the blade and the plates are counterpoised in respect to each other and both overlap the tube and the compaction or tamping plate overlaps the diffusion or deflector plate in prevention of the pressurized injectant liquid or gaseous material (fertilizer or fumigant, for example) from escaping upwardly along the trailing edge of the blade as is consistently observed in the known prior art. The plates are generally concavo-convex, the concave side facing downwardly. The angles of attack of the two plates can be varied to suit ground conditions but the lower plate is in diving attitude while the upper or tamping plate is in climbing attitude. Accordingly, the sod knife of the present invention accomplishes a highly efficient introduction of pressurized liquids and gases into a dynamic ground opening to achieve good lateral diffusion and firm sub-surface trailing tamp.

SPECIFIC DESCRIPTION

By reference first to FIG. 1 the preferred embodiment of the invention is best seen as a sod knife assembly 11 secured to a draw bar 12 by the carriage assembly 13 which supports and journals the blade mounting shaft 14. The shaft 14 is secured adjacent its lower terminal end to a knife support arm 15. The arm 15 secures the sod knife 16 and the gauge wheel 17 for coordinated movement with shaft 14 and rearwardly of the shaft 14. The wheel 17 is secured to a bracket extension 18 which forms a clevis connection. One of the fastening means 19 is a shear pin which upon shear failure allows the wheel 17, bracket 18 and knife 16 to rotate on the pivot point of fastener 20. The sod knife 16 comprises a ground opening blade 21 which is preferably arcuate along the sharp leading edge thereof and the trailing edge is substantially blunt or concave in cross section to nestably receive and protect a delivery tube 22 which is brazed, welded or otherwise secured thereto and which tube 22 terminates adjacent the heel 23 of the blade 21. There are openings through tube 22 at the lower terminal end adjacent the heel of the blade 21 through which material is passed into the soil as a furrow is opened by the movement of the blade 21. In a plane transverse to the plane of the blade 21 and at a slight diving attitude is a diffusion plate or wing 24 which extends laterally and rearwardly of the lower terminal end of the tube 22. This deflector or diffusion plate 24 is brazed, welded or otherwise secured to the cheeks of the blade 21 and straddles the tube 22 providing a physical barrier to gas or liquid flow tending to travel upwardly along the trailing edge of the blade 21. In cross section the diffusion plate 24 is slightly concavo-convex with the concave side downward. In manufacture a split tube forming the plate 24 is bifurcated longitudinally to straddle the blade 21 and tube 22 and is then brazed to the blade 21 and closed on the tube 22 as shown. At a spaced interval above the diffusion plate 24 is a second or upper plate designated as a tamping wing or plate 25. This tamping plate 25 is constructed like the diffusion or deflecting plate 24 except that its angle of attack is a climbing attitude referenced to forward movement of the blade 21 and as can be seen the tamping plate 25 is extended to termination rearwardly and above the deflector or diffusion plate 24. Thus the action of the tamping plate trailing the blade 21 and diffusion plate 24 is to provide a sub-surface tamping of soil which locally closes the furrow and prevents premature escape of the fumigant or fertilizer injected through the tube 22. It will be appreciated that various angles of "dive" and "climb" may be provided in respect to the lower diffusion plate 24 and the upper tamping plate 25 respectively and the selection is in relation to the heaviness or lightness of the soil to be treated. The preferred diving attitude of the diffusion plate 24 is between 0° and 10° from horizontal. The preferred climbing attitude of the upper tamping plate 25 is also between 0° and 10°. Under average soil conditions best results are obtained with the diving attitude of plate 24 at 7° and the climbing attitude of the tamping plate 25 at 5° from horizontal. The tube 22 is connected to a supply source line 22a as by clamp 22b and the line 22a is connected to a supply tank, not seen.

Since optimum performance is referenced to a horizontal movement of the blade 21 in a vertical crevice it is desireable to assure that the attitude of the blade 21 in moving through soil is relatively constant. Hence the carriage 12 and arm 15 on shaft 14 support the sod knife 16 at a relatively constant depth established by the gauge wheel 17. The shaft 14 is journalled in the carriage 13 at a slope or angle as seen at about 60° to the horizontal at the included angle of projected shaft 14 and earth. The shaft 14 is allowed to reciprocate axially against the bias of spring 26 acting between the shaft 14 and carriage 13. In addition, as will be seen, the shaft 14 can turn on its axis so as to allow the trailing sod knife 16 to swivel at the shaft 14 and move around obstacles and over obstacles as may be encountered. The spring 26 urges return to the setting required and allows a running flexure as between the horizon of bar 12 and soil surface contact of gauge wheel 17.

In FIG. 2 the flexural action on the spring 26 can best be seen and the phantom lines indicate change of position in an elevational sense without changing the running attitude of the sod knife 16. The roller journals or anti-friction thrust buttresses 27 and 28 are located in the rectangular or box frame 29 of carriage 13 and details of the clamp 30 providing attachment to the rectangular bar 12 are best seen. A single bar 12 drawn by a tractor can pull a plurality of knives 16. Hence the carriage 13 is secured against rotation on the bar 12 except as torsion may occur in extreme drag condition. The construction of thrust bracket 31 is also best appreciated in the FIG. 2 secured to the upper terminal end of the shaft 14 and being adjustably connected to the tension spring 26 by hook 32. The tube 22 is connected to flexible delivery line 22a by tubing clamp 22b and the line 33 connects to a source of liquid or gaseous fumigant, fertilizer, or soil conditioner. The constant attitude diving angle A is shown and climb attitude angle B is also shown.

In FIG. 3 the journal construction of the gauge wheel 17 is revealed. The journalling 33 is self contained in capped concentric sleeves and secured to the clevis bracket 18 by the bolt 34. The shear pin 19 is seen as a brass or bronze bolt and the pivot bolt or fastener 20 can be seen beneath it. The blade 16 is thus secured between the arms 15, bracket 18 and in fixed position by the fasteners 19 and 20 through arms 15, bracket 18, and blade 16. The delivery tube 22 is visible secured along the trailing edge of the blade 16. The setting of the gauge wheel 16 establishes maximum penetration depth and provides a surface tamp.

FIG. 4 best reveals the details of the sod knife 16 in the area of gas or liquid emission at the lower terminal end of tube 22 at the heel 23 of the blade 21. The plunging attitude of the diffusion blade 24 prevents gases or liquids from following up along the trailing edge of the blade 21 but provides a deflector to diffuse the materials outwardly from tube openings 35 extending radially from the terminal end of the tube 22. The plug 36 is used to facilitate radial diffusion but can be removed as desired. In FIGS. 2 and 4 the dynamics of the two plates 24 and 25 can be best appreciated. Tamping plate 25 compresses the earth at and above the fissure created by the blade 21 and the diffusion plate 24 has deflected the emitted material away from the trailing edge of the blade 21 in prevention of escape to atmosphere up the back of the blade 21.

FIGS. 5 and 6 best express the construction of carriage 13 and the concave faced roller journals 27 and 28 cradle the shaft 14 and allow it to move axially against the spring bias of spring 26. This allows the shaft 14 to turn and provides a swivelling action for the trailed sod knife 16. In the FIG. 6 the spring hanger tab 37 provides a lower fastener for the tension spring 26. The set screw 38 in the thrust bracket 31 provides an adjustable connection of bracket 31 to shaft 14.

In operation, the first observed result using the sod knife 16 was the avoidance of visible escape of gases, for example, anhydrous ammonia. On perfectly level ground the knife 16 worked beautifully in the ranges indicated without unusual stressing of the tractor moving the gang bar 12 on which plural of the knives 16 were mounted. As terrain attitudes shifted beyond the desired fixed attitude relations the knives 16 worked less satisfactorily and the described carriage structure was devised to assure relatively constant running attitude of the blade. Then optimum performance resulted. In its operational setting the tube 22 is connected to a source of fumigant, conditioner, or fertilizer which is usually under pressure in a pressure vessel or container. As seen in FIG. 1 the feed lines from the storage container are secured as by tubing clamps to the projecting upper ends of the tubes 22. These feed lines may be suitably valved as is well known in the art.

Having thus described my invention, others skilled in the art will readily perceive improvements and modifications and such improvements and modifications are intended to be included in the spirit of the present invention subject to the scope of my hereinafter appended claims.

I claim:

1. A constant attitude sod knife applicator comprising:

a carriage;

a clamp securing said carriage to a horizontal draw bar against rotation;

roller journals in said carriage providing a guide path at about 60° to horizontal;

a shaft in said carriage and on said journals whereby said shaft is movable axially and rotatable on its axis;

a spring bias between said shaft and said carriage urging said shaft downwardly in respect to said carriage;

an arm secured to the lower end of said shaft and extending radially therefrom;

a sod knife blade dependingly secured to said arm;

a tube extending down the trailing edge of said blade and open at the lowermost end adjacent the heel of said blade;

a diffusion plate on said blade in plane transverse to the plane of said blade and in a diving attitude between about 0° and 10° and extending beyond the trailing edge of said blade and slightly above the heel of of said blade;

a tamping plate on said blade in a plane transverse to the plane of said blade and in a climbing attitude, the trailing end of said tamping plate trailing said diffusion plate and said tamping plate located above and to the rear of said diffusion plate; and a depth gauging element secured to said blade and trailing said blade in a surface tamping relation thereto.

2. A soil injecting sod knife combination comprising:

a ground opening blade vertically disposed for movement through the earth and having a leading and trailing edge and a heel at the lower end of said trailing edge;

a tubular delivery element secured to the trailing edge of said blade and the lower terminal end of said tubular element having an opening therethrough adjacent said heel of said blade;

a diffusion plate in a plane transverse to the plane of said blade and secured thereto and extending therefrom and in a diving attitude with respect to horizontal and immediately above said lower terminal end of said tubular member and extending rearwardly of said blade and said tubular element; and a tamping plate positioned on said blade spaced above and partially overlapping said first diffusion plate and secured to said blade in a plane transverse to the plane of said blade and in a climbing attitude with respect to horizontal and extending above and behind said diffusion plate and said tubular element, the distance between and trailing relationship of said plates being such that soil diffused upwardly by said diffuser is compacted between said diffuser and said tamping plate.

3. The combination as expressed in claim 2 wherein said tamping plate and said diffusion plate have concavo-convex surfaces and the concave portion is faced downwardly.

4. The combination as expressed in claim 3 wherein said tamping plates and said diffusion plates are integral with said ground opening blade.

* * * * *